(12) United States Patent
Cheng et al.

(10) Patent No.: US 10,963,504 B2
(45) Date of Patent: Mar. 30, 2021

(54) ZERO-SHOT EVENT DETECTION USING SEMANTIC EMBEDDING

(71) Applicant: SRI International, Menlo Park, NJ (US)

(72) Inventors: Hui Cheng, Bridgewater, NJ (US); Jingen Liu, Orlando, FL (US); Harpreet Sawhney, Princeton Junction, NJ (US); Mohamed Elhoseiny, Piscataway, NJ (US)

(73) Assignee: SRI International, Menlo Park, CA (US)

( * ) Notice: Subject to any disclaimer, the term of this patent is extended or adjusted under 35 U.S.C. 154(b) by 411 days.

(21) Appl. No.: 16/077,449

(22) PCT Filed: Feb. 13, 2017

(86) PCT No.: PCT/US2017/017668
§ 371 (c)(1),
(2) Date: Aug. 11, 2018

(87) PCT Pub. No.: WO2017/139764
PCT Pub. Date: Aug. 17, 2017

(65) Prior Publication Data
US 2019/0065492 A1    Feb. 28, 2019

Related U.S. Application Data

(60) Provisional application No. 62/294,527, filed on Feb. 12, 2016.

(51) Int. Cl.
*G06F 16/783* (2019.01)
*G06F 16/435* (2019.01)
(Continued)

(52) U.S. Cl.
CPC ......... *G06F 16/435* (2019.01); *G06F 16/783* (2019.01); *G06F 40/30* (2020.01);
(Continued)

(58) Field of Classification Search
CPC ...... G06F 16/435; G06F 16/783; G06F 40/30; G10L 15/26; G06K 2209/01; G06K 9/344
(Continued)

(56) References Cited

U.S. PATENT DOCUMENTS 8,364,673 B2 *  1/2013  Chang .................... G06F 16/54
                                                      707/728
8,488,682 B2 *  7/2013  Chang .................. G06K 9/3266
                                                      375/240.25

(Continued)

OTHER PUBLICATIONS

Chang et. al. "Large-scale Multimodal semantic concept detection for consumer video" ACM MIR'07, Sep. 28-29, 2007.*
(Continued)

*Primary Examiner* — Hanh B Thai
(74) *Attorney, Agent, or Firm* — Moser Taboada (57) ABSTRACT

Zero-shot content detection includes building/training a semantic space by embedding word-based document descriptions of a plurality of documents into a multi-dimensional space using a semantic embedding technique; detecting a plurality of features in the multimodal content by applying feature detection algorithms to the multimodal content; determining respective word-based concept descriptions for concepts identified in the multimodal content using the detected features; embedding the respective word-based concept descriptions into the semantic space; and in response to a content detection action, (i) embedding/ mapping words representative of the content detection action into the semantic space, (ii) automatically determining, without the use of training examples, concepts in the semantic space relevant to the content detection action based
(Continued)

on the embedded words, and (iii) identifying portions of the multimodal content responsive to the content detection action based on the concepts in the semantic space determined to be relevant to the content detection action.

15 Claims, 6 Drawing Sheets (51) Int. Cl.
G06F 40/30 (2020.01)
G10L 15/26 (2006.01)
G06K 9/34 (2006.01)
(52) U.S. Cl.
CPC .............. *G06K 9/344* (2013.01); *G10L 15/26* (2013.01); *G06K 2209/01* (2013.01)
(58) Field of Classification Search
USPC ........................................................ 707/722
See application file for complete search history.

(56) References Cited

U.S. PATENT DOCUMENTS

| | | | |
|---|---|---|---|
| 8,775,341 B1* | 7/2014 | Commons | G10L 15/16 706/20 |
| 9,053,431 B1* | 6/2015 | Commons | G06N 3/08 |
| 9,244,924 B2* | 1/2016 | Cheng | G06F 16/73 |
| 9,330,722 B2* | 5/2016 | Chang | G11B 27/28 |
| 9,807,473 B2* | 10/2017 | Mei | G06N 3/0445 |
| 10,007,679 B2* | 6/2018 | Guo | G06K 9/6269 |
| 10,068,024 B2* | 9/2018 | Sawhney | G06F 40/30 |
| 10,262,654 B2* | 4/2019 | Hakkani-Tur | G06F 40/35 |
| 10,417,350 B1* | 9/2019 | Mohamed | G06F 40/58 |
| 10,504,010 B2* | 12/2019 | Mao | G06N 3/0454 |
| 10,510,000 B1* | 12/2019 | Commons | G06F 16/3344 |
| 10,546,233 B1* | 1/2020 | Bhattacharyya | G06N 3/063 |
| 10,599,700 B2* | 3/2020 | Davulcu | G06F 40/247 |
| 10,599,774 B1* | 3/2020 | Luo | G06F 40/30 |
| 2008/0201314 A1* | 8/2008 | Smith | G06F 16/40 |
| 2009/0292685 A1 | 11/2009 | Liu et al. | |
| 2009/0299999 A1* | 12/2009 | Loui | G06F 16/7857 |
| 2011/0081082 A1* | 4/2011 | Jiang | G06K 9/00765 382/170 |
| 2011/0191374 A1* | 8/2011 | Bengio | G06F 16/50 707/780 |
| 2011/0264649 A1* | 10/2011 | Hsiao | G06N 5/022 707/722 |
| 2012/0290950 A1* | 11/2012 | Rapaport | H04N 21/8358 715/753 |
| 2013/0251248 A1* | 9/2013 | Guo | G06K 9/629 382/159 |
| 2013/0282747 A1* | 10/2013 | Cheng | G06F 16/78 707/758 |
| 2014/0161322 A1 | 6/2014 | Cheng et al. | |
| 2014/0188780 A1* | 7/2014 | Guo | G06N 20/00 706/52 |
| 2016/0110433 A1* | 4/2016 | Sawhney | G06F 40/30 707/722 |
| 2016/0132754 A1* | 5/2016 | Akhbardeh | G06K 9/00771 382/103 |
| 2017/0061250 A1* | 3/2017 | Gao | G06N 3/0454 |
| 2017/0083508 A1* | 3/2017 | Dixon | G06F 40/58 |
| 2017/0116204 A1* | 4/2017 | Davulcu | G06F 16/355 |
| 2017/0147910 A1* | 5/2017 | Mao | G06N 3/0445 |
| 2017/0150235 A1* | 5/2017 | Mei | G06F 40/253 |
| 2017/0160813 A1* | 6/2017 | Divakaran | G06N 20/10 |
| 2017/0200066 A1* | 7/2017 | Wang | G06N 3/08 |

OTHER PUBLICATIONS

Mohamed Elhoseiny et al., Zero-Shot Even Detection by Multimodal Distributional Semantic Embedding of Videos, arXiv:1512.00818v2, Dec. 16, 2015.
Xiaojun Chang et al., "Semantic Concept Discovery for Large-Scale Zero-Shot Even Detection", In: Proceedings of the 24th International Joint Conference on Artificial Intelligence (IJCAI 2015), pp. 2234-2240, Jul. 25-31, 2015.
International Search Report and Written Opinion dated May 19, 2017 for PCT Application No. PCT/US2017/017668.

\* cited by examiner

ZERO-SHOT EVENT DETECTION USING SEMANTIC EMBEDDING

GOVERNMENT RIGHTS

This invention was made with government support under contract no. D11PC20066 awarded by the Intelligence Advanced Research Projects Activity by way of the Department of the Interior National Business Center. The Government has certain rights in this invention.

BACKGROUND

Every minute, hundreds of hours of video are uploaded to video archival sites such as YouTube. Developing methods to automatically understand the events captured in such large volume of videos is necessary and meanwhile challenging. One of the important tasks in this direction is event detection in videos. A main objective of this task is to determine the relevance of a video to an event based on the video content (e.g., feeding an animal, birthday party).

Typically, the classification of complex events captured in video by automated computer analysis currently relies on machine-learning-trained classifiers that attempt to recognize such events based on low-level visual features extracted from the video. These classifiers typically must be trained with many labelled video examples for each one of the complex events that is to be detected.

SUMMARY

Embodiments of the present principles generally relate to zero-shot content detection.

In accordance with one embodiment an automated content detection system for semantic retrieval of multimodal content includes one or more non-transitory machine accessible storage media and instructions executable by one or more processors to cause a computing system to build a semantic space by embedding word-based document descriptions of a plurality of documents into a multi-dimensional space using a semantic embedding technique; detect a plurality of features in the multimodal content by applying feature detection algorithms to the multimodal content; determine respective word-based concept descriptions for concepts identified in the multimodal content using the detected features; embed the respective word-based concept descriptions into the semantic space; and in response to a content detection action, such as a concept query or an event query, (i) embed words representative of the content detection action into the semantic space, (ii) automatically determine, without the use of training examples, concepts in the semantic space relevant to the content detection action based on the embedded words, and (iii) identify portions of the multimodal content responsive to the content detection action based on the concepts in the semantic space determined to be relevant to the content detection action.

In some embodiments, the content detection system implements distributional semantic embedding and the plurality of documents include a plurality of text-based documents. In some embodiments the plurality of text-based documents include at least one of online news sources, online dictionaries or online encyclopedic material and the word-based document descriptions of the plurality of documents describe concepts in the plurality of documents.

In some embodiments, the respective word-based concept descriptions are embedded into the semantic space based on a location of the word-based document descriptions of the plurality of documents in the semantic space. In some embodiments, the concepts identified in the multimodal content include at least one of audio content, video content and text content. In some embodiments, the words representative of the content detection action are embedded into the semantic space based on a location of the word-based document descriptions of the plurality of documents in the semantic space and corresponding word vectors for the words representative of the content detection action.

In some embodiments, concepts in the semantic space relevant to the content detection action are determined using a relative location of the word-based concept descriptions and the words representative of the content detection action in the semantic space and a similarity function. In various embodiments, a number of results to be retrieved as a result of the content detection action can be limited by a distance measure threshold or can be limited to a number of results, for example, by a user input.

In some embodiments, the computing system is further configured to automatically deliver the identified portions of the multimodal content to a user for display.

In some embodiments, a content detection system for a zero-shot event query of multimedia content includes one or more non-transitory machine accessible storage media and instructions executable by one or more processors to cause a computing system to determine a semantic space by embedding a first set of words retrieved from a plurality of training documents into a multi-dimensional space using a distributional semantic embedding technique; detect a plurality of semantic features in multimedia content by applying semantic feature detection algorithms to the multimedia content; identify, as a second set of respective words, concepts in the multimedia content using the detected features; embed the second set of respective words representative of the identified concepts into the semantic space based on an embedding location of the first set of words; and in response to an event query, (i) embed a third set of words representative of the event query into the semantic space and (ii) automatically determine at least one concept of the multimedia content relevant to the event query based on the embedded second set and third set of words.

In some embodiments, the computing system is further configured to identify portions of the multimedia content responsive to the event query based on the concepts in the semantic space determined to be relevant to the event query and deliver the identified portions of the multimedia content to a user for display. In some embodiments, the concepts identified in the multimedia content include at least one of audio content, video content and text content.

In some embodiment, a computing device for zero-shot content detection of multimodal content, includes a processor; and a memory coupled to the processor, the memory having stored therein a multimedia content understanding module, a natural language generator module and a semantic space generator module. The computing device includes instructions executable by the processor to configure the computing device to build a semantic space by embedding word-based document descriptions of a plurality of documents into a multi-dimensional space using a semantic embedding technique; detect a plurality of features in the multimodal content by applying feature detection algorithms to the multimodal content; determine respective word-based concept descriptions for concepts identified in the multimodal content using the detected features; embed the respective word-based concept descriptions into the semantic space; and in response to a content detection action, (i) embed words representative of the content detection action into the semantic space, (ii) automatically determine concepts in the semantic space relevant to the content detection action based on the embedded words, and (iii) identify portions of the multimodal content responsive to the content detection action based on the concepts in the semantic space determined to be relevant to the content detection action, without the use of training examples.

In some embodiments the computing device includes a search request module and a user interface device for enabling an initiation of a content detection action. In some embodiments the computing device includes at least one of an optical character recognition system to generate text transcripts of text in the multimodal content and an automatic speech recognition system to generate text transcripts of speech in the multimodal content. In some embodiments the computing device is further configured to deliver the identified portions of the multimodal content to a user for display. In some embodiments, the concepts identified in the multimodal content include at least one of audio content, video content and text content.

In some embodiments a method for zero-shot content detection includes building a semantic space by embedding word-based document descriptions of a plurality of documents into a multi-dimensional space using a semantic embedding technique; detecting a plurality of features in the multimodal content by applying feature detection algorithms to the multimodal content; determining respective word-based concept descriptions for concepts identified in the multimodal content using the detected features; embedding the respective word-based concept descriptions into the semantic space; and in response to a content detection action, (i) embedding words representative of the content detection action into the semantic space, (ii) automatically determining concepts in the semantic space relevant to the content detection action based on the embedded words, and (iii) identifying portions of the multimodal content responsive to the content detection action based on the concepts in the semantic space determined to be relevant to the content detection action, without the use of training examples.

In some embodiments, the concepts identified in the multimodal content include at least one of audio content, video content and text content. In some embodiments the method further includes delivering the identified portions of the multimedia content to a user for display. In some embodiments, the content detection action comprises at least one of a concept query or an event query.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to methods, apparatuses and systems for zero-shot content detection using semantic embedding. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to visual concepts, such teachings should not be considered limiting. Embodiments in accordance with the present principles can be applied to audio concepts and other such concepts as described herein.

Reference will be made to multimedia and multimodal content throughout this disclosure. It should be noted that the terms can be used interchangeably herein to refer to content that has multimedia components, such as text audio and video, and/or multimodal components, such as speech, graphics, and gestures.

Search and retrieval of videos for arbitrary events using only free-style text and unseen text, in particular, has been an unrealized goal in computational video and multi-media understanding. This is referred to as "zero-shot event detection" mainly because there is no positive exemplar videos to train a detector. Due to the proliferation of videos, especially consumer-generated videos (e.g., YouTube), zero-shot search and retrieval of videos has become an increasingly important issue.

Embodiments in accordance with the present principles are directed at automatically retrieving relevant concepts and events in multimedia/multimodal content by leveraging information from semantic embedding, such as distributional semantic embedding. An advantageous result is the ability to use a detection event, such as an event text query (i.e. just the event title like "birthday party" or "feeding an animal"), to retrieve a list of video(s) and or video clips (i.e., a ranked list of video clips), frames, segments, and the like based on their content. For example, in some embodiments in accordance with the present principles, information from a semantic space, such as a distributional semantic space, trained using a plurality of content, such as a large text corpus, is leveraged to embed/map concepts, content detection queries and multimedia/multimodal content to the same space, where similarities can be directly estimated. In some embodiments in accordance with the present principles, various similarity metrics are implemented in a distributional semantic space to enable content detection (e.g., event retrieval) based on, for example, (a) concepts, (b) ASR, and (c) OCR in videos. The unified framework is capable of embedding (a), (b), and (c), above, into a same semantic space enabling high speed content detection/retrieval results, which makes it applicable to both a large number of multimedia/multimodal content and concepts. In some embodiments, concepts, video information and event queries are embedded into a distributional semantic space whose dimensionality is independent of the number of concepts.

As described above, in some embodiments in accordance with the present principles, a semantic space is trained on a large text corpus. In various embodiments the semantic space is a statistical distribution and is itself computer-generated through statistical analysis of large corpuses of documents, such as online collections of news stories, and/or online encyclopedic material like Wikipedia.

For example, in some embodiments, a plurality of terms can be received from textual documents such as Wikipedia and Google news. The terms can include phrases (i.e., groups of words) and independent words, and can even be a single word. The terms received can be projected into at least one ontology source, to determine a normalized set of concepts represented by the received terms. An ontology source in this context represents a data source that describes the relationships of particular terms to concepts (e.g., the words used to describe a particular concept in an encyclopedia), and can further relate the described concepts to one another. Exemplary ontology sources that can be used for this purpose include community-generated content such as general encyclopedias (e.g., Wikipedia®), directories (e.g., the Open Directory Project), and topic-specific encyclopedias (e.g., the Internet Movie Database). Domain-specific ontologies and/or dictionaries can also be used as ontology sources, whether general or topic-specific (e.g., medical dictionaries and legal dictionaries). Community-generated ontology sources are typically the result of iteration, modification, and refinement by a group of community members, such that the resulting data represents a consensus of the community on the meanings and relationships of the particular represented terms, topics, and concepts.

The word(s) and/or phrases (i.e., first set of word(s) and/or phrases) representative of the concepts/topics can be thereby embedded into a common semantic space in terms of textual language/words. Thus, in various embodiments, through a combined use of, for example, (a) video classifiers for familiar, lower-level concepts in multimodal concepts trained in terms of low-level visual features, and (b) the embedded semantic space representing relationships between textual words and descriptors of concepts and complex events, an innovative, powerful, multimodal classification capability is provided to facilitate users performing free-text searching for video clips depicting complex events of interest.

In accordance with various embodiments of the present principles, a semantic space is built/trained using a distributional semantic model. An example of a distributional semantic model that can be used for training a semantic space, $M_s$, in accordance with the present principles can be found in Mikolov, T.; Chen, K.; Corrado, G.; and Dean, J. 2013a. "Efficient estimation of word representations in vector space"; in *ICLR* and Mikolov, T.; Sutskever, I.; Chen, K.; Corrado; G. S.; and Dean, J. 2013b. "Distributed representations of words and phrases and their compositionality"; in *NIPS*, the teachings of which are both incorporated herein by this reference in their entireties. For such spaces, words and their context in billions of documents along with negative examples of words out of context are used to train an embedding space in which mapped vectors in context are neighbors while mapped vectors out of context are not. This method produces a high-dimensional space, typically 300-D, in which related words are closer than unrelated words.

The trained semantic space can be denoted by $M_s$ and the vectorization function that maps a word to $M_s$ space can be denoted as vec(•). The dimensionality of the real vector returned from vec(•) is denoted by M. The models learn a vector for each word, $w_n$, such that $p(w_n|(w_{i-L}, w_{i-L+1}, \ldots, w_{i+L-1}, w_{i+L}))$ is maximized over the training corpus of documents, in which, for the example above, 2×L is the context window size. The term above captures the context of $w_n$ within the context of words that occur before $w_n$ and those that occur after $w_n$ as a probability distribution. As such, a similarity between $vec(w_i)$ and $vec_{(i)}$ is high if the words co-occurred many times in, for example, a context of the size 2×L in the training text-corpus (i.e., semantically similar words share similar context). Based on the trained $M_s$ space, it is defined how to embed a content detection action, such as an event query e, and concepts, c. That is, an event query for concept based retrieval can be denoted by $e_c$, while query keywords for OCR and ASR can be denoted by $e_0$ and $e_a$, respectively. As such, a total event query can be represented as $e=\{e_c, e_0, e_a\}$. Each of $e_c$, $e_a$, and $e_0$ is a set of one or more words. Each of these words can be directly embedded into the $M_s$ manifold by a vec(•) function. Accordingly, the sets of word vectors for each of $e_c$, $e_a$, and $e_0$ can be represented as $\theta(e_c)$, $\theta(e_a)$, and $\theta(e_0)$, collectively denoted as $\theta(e)$. Regarding the embedding of concepts, c, each concept $c^* \epsilon c$ is defined by its name and optionally some related keywords. As such, the corresponding word vectors are then used to define an embedding location, $\theta(c^*)$, for a respective concept in the $M_s$ space (described in further detail below).

In accordance with embodiments of the present principles, a plurality of semantic features are detected in multimedia content by applying semantic feature detection algorithms to the multimedia content. Concepts in the multimedia content are then identified as natural language word(s) and/or phrases (i.e., a second set of words) using the detected features in the multimedia content. The term "concepts" can be used herein to describe what is traditionally referred to as a concept in multimedia content, a speech transcript, where the speech transcript can be generated by, for example, an automated speech recognition (ASR) module of the content detection system 110 and/or the computing device 100, and a text transcript, where the text transcript can be generated by, for example, an optical character recognition (OCR) module of the content detection system.

Figure 1:
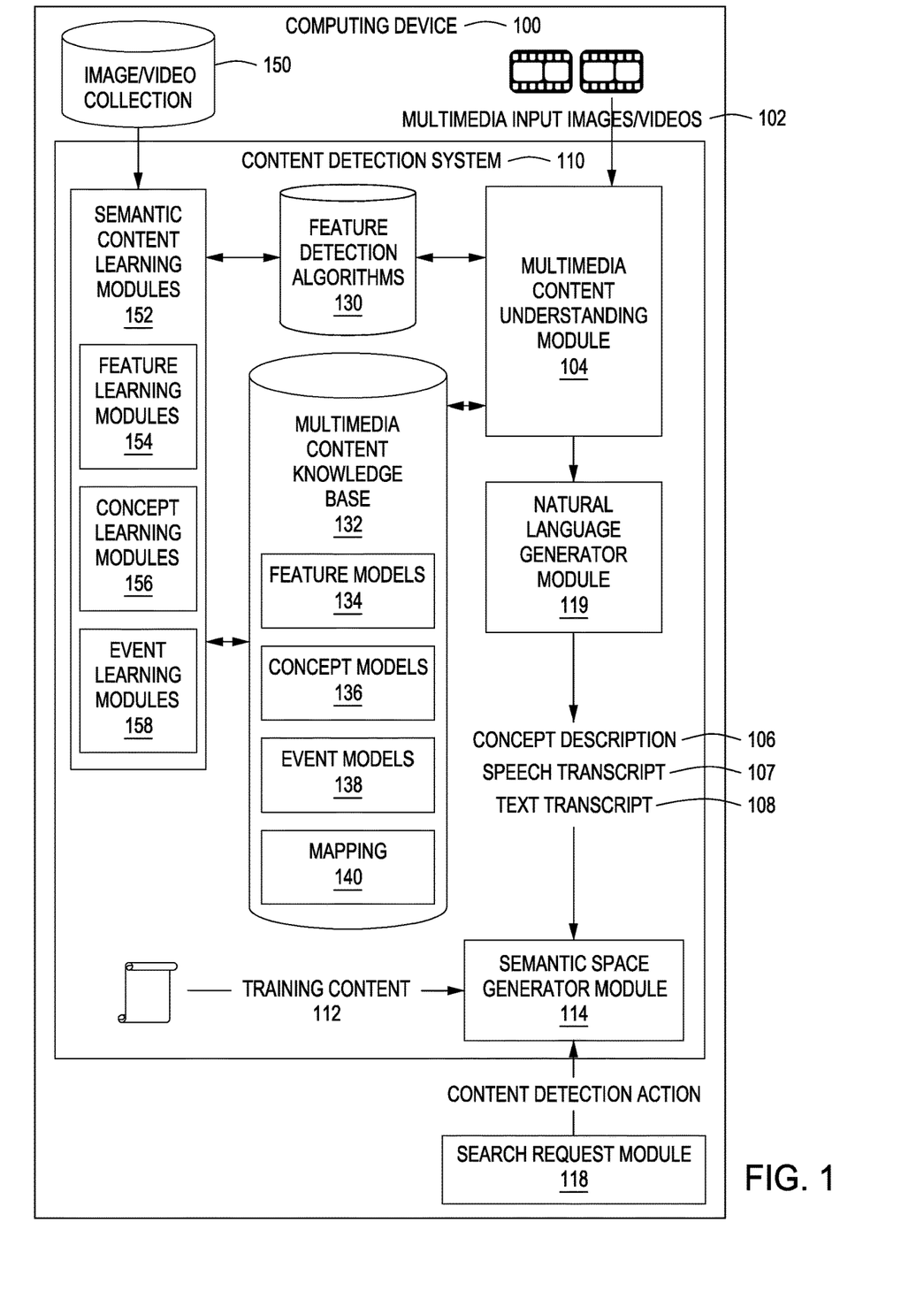
FIG. 1 depicts a high level block diagram of a content detection system for zero-shot content detection in accordance with an embodiment of the present principles.
Figure 5:
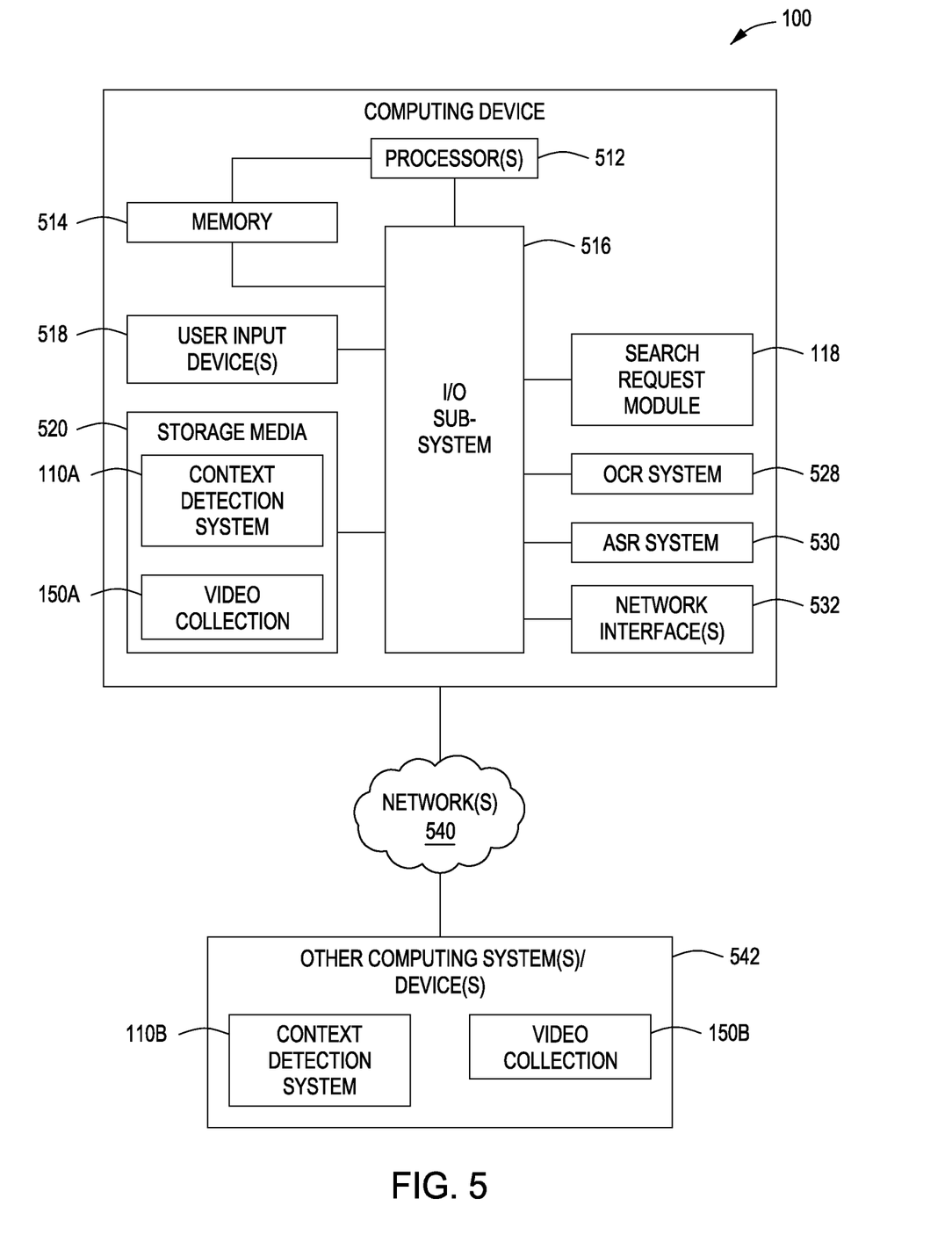
FIG. 5 depicts a high level block diagram of a computing device in which the content detection system of FIG. 1 can be implemented in accordance with an embodiment of the present principles.

For example, referring to FIG. 1, as illustrated, a content detection system 110 in accordance with some embodiments of the present principles can be embodied in a computing device 100, an example of which is shown in FIG. 5, described below. In FIG. 1, an embodiment of the content detection system 110 is shown in the context of an environment that can be created during the operation of the content detection system 110 (e.g., a physical and/or virtual execution or "runtime" environment). The illustrative content detection system 110 is embodied as a number of machine-readable instructions, modules, data structures and/or other components, which can be implemented as computer hardware, firmware, software, or a combination thereof.

The content detection system 110 of FIG. 1 executes computer vision algorithms, including machine learning algorithms, semantic reasoning techniques, and/or other technologies to, among other things, in an automated fashion, identify, understand, and describe concepts that are depicted in a multimedia content input 102 that can, in one embodiment, comprise a collection of user content. As described in more detail below, the illustrative content detection system 110 can, among other things, identify features, concepts and events in multimedia content 102, such as user stored multimedia content, and enables users to quickly and easily locate particular events and concepts in lengthy and/or large volumes of multimedia content, such as still pictures and video footage, without the typical need for extensively trained machine learning of the complex events. The content detection system 110 can generate a natural language (NL) description (e.g., a second set of word(s) and/or phrases) of the multimedia content input 102, which describes the multimedia content of the input 102 in a manner that can be used for embedding, at least, low-level concepts and, in some embodiments, higher-level events detected in the multimedia content into a semantic space, such as a distributional semantic space (described in more detail below).

More specifically, the content detection system 110 can be used to automatically detect and describe concepts and events in the multimedia content (also referred to as multimodal content, video and/or video content herein). As used herein, "concepts" can also refer to, among other things, lower-level events that are made up of multiple "constituent" people, objects, scenes, audio, text and/or activities that make up more complex events. For example, some concepts related to a more complex event, such as a birthday party, can include the activities of singing, blowing out candles, opening presents, and eating cake. Similarly, some related concepts of a more complex event such as a child acting out an improvisation can include people smiling, laughing, dancing, drawing a picture, and applause and other concepts related to the complex event of a group activity relating to a political issue, sports event, or music performance can include a group of people walking or standing together, a person holding a sign, written words on the sign, a person wearing a t-shirt with a slogan printed on the shirt, and human voices shouting. The activities that make up a concept are not limited to visual features. Rather, "activities" of a concept as used herein may refer to, among other things, visual, audio, and/or text features, which may be detected by the content detection system 110 in an automated fashion using a number of different algorithms and feature detection techniques, as described in more detail below. Stated another way, an activity as used herein may refer to any semantic element of the multimedia input 102 that, as determined by the content detection system 110, evidences a concept.

As used herein, "multimedia content/input" can refer to, among other things, a collection of digital images, a video, a collection of videos, or a collection of images and videos (where a "collection" includes two or more images and/or videos) some or all of which can include an audio component and text component. References herein to a "video" can refer to, among other things, a relatively short video clip, an entire full-length video production, or different segments within a video or video clip (where a segment includes a sequence of two or more frames of the video). Any video of the multimedia input 102 can include or have associated therewith an audio soundtrack and/or a speech transcript, where the speech transcript may be generated by, for example, an automated speech recognition (ASR) module of the content detection system 110 and/or the computing device 100. Any video or image of the input 102 can include or have associated therewith a text transcript, where the text transcript can be generated by, for example, an optical character recognition (OCR) module of the content detection system 110 and/or the computing device 100. References herein to an "image" may refer to, among other things, a still image (e.g., a digital photograph) or a frame of a video (e.g., a "key frame").

A multimedia content understanding module 104 of the content detection system 110 of FIG. 1 is embodied as software, firmware, hardware, or a combination thereof. The multimedia content understanding module 104 applies a number of different feature detection algorithms 130 to the multimedia input 102, and in some embodiments, using a multimedia content knowledge base 132, and generates one or more of a speech transcript 107, a text transcript 108 and natural language concept descriptions (e.g., a set of respective words identifying the concepts) 106 based on the output of the algorithms 130. The multimedia knowledge base 132 is embodied as software, firmware, hardware, or a combination thereof (e.g., as a database, table, or other suitable data structure or computer programming construct). The illustrative multimedia content understanding module 104 executes different feature detection algorithms 130 on different parts or segments of the multimedia input 102 to detect different features, or the multimedia content understanding module 104 executes all or a subset of the feature detection algorithms 130 on all portions of the multimedia input 102.

Some examples of feature detection algorithms and techniques, including low-level, mid-level, and complex event detection and recognition techniques, are described in a commonly owned patent application, Cheng et al., U.S. Utility patent application Ser. No. 13/737,607 ("Classification, Search, and Retrieval of Complex Video Events"); and also in Chakraborty et al., U.S. Utility patent application Ser. No. 14/021,696, filed Sep. 9, 2013 ("Recognizing Entity Interactions in Visual Media"), Chakraborty et al., U.S. Utility patent application Ser. No. 13/967,521, filed Aug. 15, 2013 ("3D Visual Proxemics: Recognizing Human Interactions in 3D from a Single Image"), Han et al., U.S. Pat. No. 8,634,638 ("Real-Time Action Detection and Classification"), Eledath et al., U.S. Pat. No. 8,339,456 ("Apparatus for Intelligent and Autonomous Video Content and Streaming"), all of SRI International and each of which is incorporated herein by this reference. Additionally, technologies for visual feature detection and indexing are disclosed in Sawhney, Harpreet S. et al., U.S. Utility patent application Ser. No. 14/452,237 ("Multi-Dimensional Realization of Visual Content of an Image Collection"), which is incorporated herein by this reference.

For example, in at least one embodiment, both static and dynamic low-level visual features are detected. Static visual features include features that are extracted from individual key-frames of a video at a defined extraction rate (e.g., 1 frame/second). Some examples of static visual feature detectors include Gist, SIPT (Scale-Invariant Peature Transform), and colorSIFT. The Gist feature detector can be used to detect abstract scene and layout information, including perceptual dimensions such as naturalness, openness, roughness, etc. The SIFT feature detector can be used to detect the appearance of an image at particular interest points without regard to image scale, rotation, level of illumination, noise, and minor changes in viewpoint. The colorSIFT feature detector extends the SIFT feature detector to include color keypoints and color descriptors, such as intensity, shadow, and shading effects.

Dynamic visual features include features that are computed over x-y-t segments or windows of the video. Dynamic feature detectors can detect the appearance of actors, objects and scenes as well as their motion information. Some examples of dynamic feature detectors include MoSIFT, STIP (Spatio-Temporal Interest Point), DTFHOG (Dense Trajectory based Histograms of Oriented Gradients), and DTF-MBH (Dense-Trajectory based Motion Boundary Histogram). The MoSIFT feature detector extends the SIFT feature detector to the time dimension and can collect both local appearance and local motion information, and identify interest points in the video that contain at least a minimal amount of movement. The STIP feature detector computes a spatial-temporal second-moment matrix at each video point using independent spatial and temporal scale values, a separable Gaussian smoothing function, and space-time gradients. The DTF-HoG feature detector tracks two-dimensional interest points over time rather than three-dimensional interest points in the x-y-t domain, by sampling and tracking feature points on a dense grid and extracting the dense trajectories. The HoGs are computed along the dense trajectories to eliminate the effects of camera motion). The DTF-MBH feature detector applies the MBH descriptors to the dense trajectories to capture object motion information. The MBH descriptors represent the gradient of optical flow rather than the optical flow itself. Thus, the MBH descriptors can suppress the effects of camera motion, as well. However, HoF (histograms of optical flow) may be used, alternatively or in addition, in some embodiments.

Concept detection is then performed by, for example, the multimedia content understanding module 104 based on the low-level features. In one embodiment, the multimedia content understanding module 104 uses one or more concept classifiers to analyze the low-level features and derive therefrom semantic elements, which represent the higher-level concepts.

For example, in some embodiments, concept detectors are applied to the features to identify the atomic, concept-level semantic elements (e.g., actions, scenes, objects, actors, audio, text) associated with the low-level features. In some embodiments, static features, dynamic features, and BoW representations defined over codebooks of the features are used as inputs to the concept detectors. Concept classifiers (e.g., binary SVM classifiers) can be used to classify the features according to their concept type. A concept detector is defined or selected for each concept type (suitable concept detectors are publicly available) and applied to the features associated with the concept type. For example, an action concept detector might determine whether a video feature likely depicts an "animal eating" or a "person dancing," while a scene concept detector can determine whether the video feature likely depicts a "church" or a "kitchen" and an object concept detector may determine whether the video feature likely depicts a "wheel" or "food."

Generally speaking, a concept detector takes an input x, applies a concept detection algorithm to x, and outputs a detection confidence indicating the likelihood that x depicts the concept that the concept detector is designed to detect. In the case of concept detectors that detect actions, the input x is a short segment of the video. For concept detectors that detect scenes, objects, or actors, the input x is a key-frame or a series of key-frames sampled from the video. Once a concept is identified, a natural language (word) description can be determined for the concepts, using, for example, a natural language generator. That is, in various embodiments in accordance with the present principles, concepts in the multimedia content are identified using the detected features. The concepts can be identified as a second set of respective word(s) and/or phrases representative of the identified concepts.

With reference to FIG. 1, in some embodiments, to identify concepts in the multimedia content 102, the illustrative multimedia content understanding module 104 accesses one or more feature models 134 and/or concept models 136 and optionally event models 138. The feature models 134, the concept models 136 and optional event models 138 are embodied as software, firmware, hardware, or a combination thereof, e.g., a knowledge base, database, table, or other suitable data structure or computer programming construct. The models 134, 136, 138 correlate semantic descriptions of features, concepts and, optionally, events with instances or combinations of output of the algorithms 130 that evidence those features and concepts and events. For example, the feature models 134 may define relationships between sets of low level features detected by the algorithms 130 with semantic descriptions of those sets of features (e.g., "object," "person," "face," "ball," "vehicle," etc.). Similarly, the concept model 136 can define relationships between sets of features detected by the algorithms 130 and higher-level "concepts," such as people, objects, actions and poses (e.g., "sitting," "running," "throwing," etc.). Similarly, the event models 138 can define relationships between sets of concepts and events. The semantic descriptions of features and concepts and events that are maintained by the models 134, 136, and optionally 138 can be embodied as natural language descriptions and/or structured data. In some embodiments in accordance with the present principles, a mapping 140 of the knowledge base 132 defines relationships between various combinations of features, concepts, events, and activities. The concept can be determined using semantic reasoning in connection with the knowledge base 132 and/or the mapping 140. To establish relationships and associations, the content detection system 110 can utilize, for example, a knowledge representation language or ontology.

The mapping 140 of the knowledge base 132 links activities with concepts, so that, once a concept is determined, the understanding module 104 can determine activities that are associated with the concept and look for those activities in the input 102. A natural language concept description (e.g., set of word(s) and or phrases) 106 for at least the identified concepts can then be generated using, for example, a natural language generator module 119 of the content detection system 110. The mapping 140 can establish one-to-one, one-to-many, or many-to-many logical relationships between the various concepts and activities in the knowledge base 132. In general, the mapping 140 and the various other portions of the knowledge base 132 can be configured and defined according to the requirements of a particular design of the content detection system 110 and/or the computing device 100 (e.g., according to domain-specific requirements).

The illustrative content detection system 110 includes a number of semantic content learning modules 152, including feature learning modules 154, a concept learning module 156 and, optionally, an event learning module 158. The learning modules 152 execute machine learning algorithms on samples of multimedia content (images, video and/or audio) of an image/video collection 150 and create and/or update portions of the knowledge base 132. For example, the learning modules 152 can be used to initially populate and/or periodically update portions of the knowledge base 132. The feature learning modules 154 analyze sample images and videos from the collection 150 and populate or update the feature models 134. For example, the feature learning modules 154 can, over time or as a result of analyzing portions of the collection 150, algorithmically learn patterns of computer vision algorithm output that evidence a particular feature, and update the feature models 134 accordingly. Similarly, the concept learning modules 156 and event learning modules 158 can, over time or as a result of analyzing portions of the collection 150, algorithmically learn combinations of low level features that evidence particular concepts, and algorithmically learn combinations of concepts and higher level features that evidence particular events and update the concept models 136 and event models 138, accordingly.

The illustrative learning modules 152 analyze portions of the image/video collection 150 to determine criteria, to identify features and/or concepts and/or events for inclusion in the mapping 140, to identify activities that are associated with the features or concepts. For example, the event learning modules 152 can identify a new feature, concept, event or activity for inclusion in the mapping 140 based on the frequency of occurrence of certain features and/or concepts and/or events in the collection 150. The learning modules 152 can also identify multimodal concept markers including "non-visual" characteristics of input videos such as object motion, changes in motion patterns, changes in camera position or camera motion, amount or direction of camera motion, camera angle, audio features (e.g., cheering sounds or speech).

The video collection 150 refers generally to one or more bodies of retrievable multimedia digital content that can be stored, for example, in a memory of the computing device 100 and/or other computing systems or devices. The video collection 150 can include images and/or videos stored remotely at Internet sites such as YOUTUBE and INSTAGRAM, and/or images/videos that are stored in one or more local collections, such as storage media of a personal computer or mobile device (e.g., a "camera roll" of a mobile device camera application). In any case, images/videos in the collection 150 need not have been previously tagged with meta-data or other identifying material in order to be useful to the content detection system and/or the computing device 100. The content detection system and/or the computing device 100 can operate on images/videos 150 and/or multimedia input 102 whether or not it has been previously tagged or annotated in any way. To the extent that any of the content in the collection 150 is already tagged with descriptions, any of the learning modules 152 can learn and apply those existing descriptions to the knowledge base 132.

The semantic space generator module 114 of FIG. 1 uses a plurality of training content to train a semantic space, such as a distributional semantic space as described above. In some embodiments in accordance with the present principles, the training content 112 includes text based documents, which can include online collections of news stories, and/or online encyclopedic material like Wikipedia, which can be retrieved by or communicated to the content detection system 110. In other embodiments, such text based documents can be stored locally and can be communicated to the semantic space generator module 114 for training the distributional semantic space. For example, in one embodiment, the collection 150 includes more than just images and videos and the training documents can be retrieved from the collection 150.

In other embodiments in accordance with the present principles, the training content can include audio content for which audio transcripts can be generated using, for example, automated speech recognition (ASR). Such transcripts can be communicated to the semantic space generator module 114 as words or phrases for training the semantic space. In other embodiments in accordance with the present principles, the training content can include video content including text for which text transcripts can be generated using, for example, optical character recognition (OCR). Such text transcripts can be communicated to the semantic space generator module 114 as word(s) and/or phrases for training the distributional semantic space.

As will be described in further detail below, once the distributional semantic space is trained, multimedia content to be searched, such as the multimedia content 102, can be map into the semantic space. In the embodiment of FIG. 1, the semantic space generator module 114 embeds at least one of the natural language concept description 106, the speech transcript 107, and the text transcript 108 into the distributional semantic space as word(s) and/or phrases. The respective words and/or phrases representative of the multimedia content are embedded into the distributional semantic space by the semantic space generator module 114 (see FIG. 2). That is, in various embodiments in accordance with the present principles, the respective words (i.e., second set of respective words) representative of at least the identified concepts (and in other embodiments, the speech transcript and text transcript) are mapped into the semantic space based on an embedding location of the word(s) and or phrases (i.e., first set of words) embedded in the semantic space as a result of the training of the semantic space.

The search request module 118 of FIG. 1 enables a content detection action/search request, such as an event query or concept query, to be initiated for retrieving and/or identifying content of the multimedia content 102. In some embodiments, a content detection action is initiated using a human-computer interface including one or more input devices (e.g., a touchscreen, keyboard, virtual keypad, microphone, etc.) (not shown). In one embodiment, the content detection action can be configured as natural language word(s) and/or phrases (i.e., a third set of words). In other embodiments, the content detection action can be configured as speech and can be converted to word(s) and/or phrases using automated speech recognition (ASR).

As will be described in further detail below, the word(s) and/or phrases representative of the content detection action (i.e., a third set of words) are mapped into the distributional semantic space by, for example, the semantic space generator module 114. In some embodiments in accordance with the present principles, in response to a content detection action, word(s) and/or phrases representative of the content detection action are mapped into the distributional semantic space. In some embodiments in accordance with the present principles, the words representative of the content detection action are embedded into the semantic space based on a location of word-based document descriptions of the plurality of documents in the semantic space and corresponding word vectors for the words representative of the content detection action.

Content relevant to the content detection action and/or event query is determined based on the position/location of the word(s) and/or phrases representative of the content detection action and the word(s) and/or phrases representative of the concepts of the multimedia content in the semantic space. That is, at least one concept of the multimedia content relevant to the content detection action is automatically determined based on the mapped word(s) and/or phrases representative of the content detection action (third set of words) and the word(s) and/or phrases representative of the concepts of the multimedia content (second set of words) in the semantic space and a similarity function (described in greater detail below).

As described in further detail below, in some embodiments in accordance with the present principles, word(s) and/or phrases representative of concepts in the multimedia content relevant to the content detection action are determined using, for example, a similarity function, such as, in one embodiment, a nearest neighbor function, and a distance measure. Word(s) and/or phrases identified as a result of the content detection action can be presented as, for example, a 3D PCA visualization of the relevant word(s) and/or phrases (see FIG. 3).

In various embodiments, video clips, frames, etc., of the multimedia content identified by the word(s) and/or phrases in the semantic space relevant to the word(s) and/or phrases representative of the content detection action and/or event query are returned as a result of the content detection action and/or event query. In some embodiments, such video clips, frames, etc., can be presented to an originator of the event query, or some other user, on a display.

In some embodiments, the search request module 118 can optionally further enable the defining of search parameters. For example, in one embodiment, a user can enter a score to be used as a threshold for the returned results.

In accordance with the present principles, given an arbitrary event query, e, and a video, v, in one embodiment, the objective is to model p(e|v), which represents the probability of occurrence of an event, e, given a video, v. Initially, representations of an event query, e, a concept set, c, and the video, v, are defined. In one embodiment, an unstructured event title is used to represent an event query for concept based retrieval in accordance with the present principles. In such embodiments, additional terms specifically for ASR or OCR based retrieval can be used. As described above, a few-keyword event query for concept based retrieval can be denoted by $e_c$, while query keywords for OCR and ASR can be denoted by $e_O$ and $e_a$, respectively. As such, a total event query can be represented as $e=\{e_c, e_O, e_a\}$.

A total concept set can be denoted as c, which can include visual concepts, $c_v$, and audio concepts, $c_d$, with $c=\{c_v, c_d\}$. In various embodiments, the visual concepts can include object, scene and action concepts. In addition, the audio concepts can include acoustic related concepts like water sound. For purposes of ease of understanding, the embodiments described herein will be described primarily with reference to visual concepts for concept-based retrieval (e.g., $c_d$=0).

Each member, $c_i$ E c can be defined as the $i^{th}$ concept in c. In various embodiments, $c_i$ can be defined by the $i^{th}$ concept's name and optionally some related keywords. As such, $c=\{c_1, \ldots c_N\}$ is the set of concept definitions, where N is the number of concepts.

For zero-shot purposes in accordance with various embodiments of the present principles described herein, a video, v, can be defined by at least three pieces of information, which include video OCR, denoted by $v_O$, video ASR, denoted by $v_a$, and video concept representation denoted by $v_c$. In one embodiment, $v_O$ and $v_a$ represent the detected text in OCR and speech in ASR, respectively, in the video. The video concept based representation, $v_c$, can be defined according to equation one (1) which follows:

$$v_c=[p(c_1|v),p(c_2|v),\ldots,p(c_N|v)] \quad (1)$$

where $p(c_i|v)$ represents a conditional probability of concept $c_i$ given video v. Hereinafter $p(c_i|v)$ is denoted as $v_c^i$.

In various embodiments of zero-shot event detection in accordance with the present principles, one goal is to recognize complex events in videos without the need for training examples and based on the multimedia content of the video, including still-image concepts like objects and scenes, action concepts, OCR, and ASR. Although training examples are not needed to recognize complex events (or optionally concepts embedded in the semantic space) in accordance with the present principles, it should be noted that classifiers for other, lower-level concepts/features can be machine learned using training examples as described above.

Given video components, $v=\{v_c, v_O, v_a\}$, one goal is to compute p(e|v) by embedding both the event query, e, and information of the video, v, of different modalities ($v_c$, $v_O$, $v_a$) into a distributional semantic space, where a relevance of v to e can be directly computed. Specifically, one approach is to model p(e|v) as a function, F of $\theta(e)$, $\psi(v_c)$, $\theta(v_O)$, and $\theta(v_a)$, which represents the distributional semantic embedding of e, $v_c$, $v_O$, and $v_a$, respectively, into a semantic space (also referred to as a trained semantic space, distributional semantic manifold, $M_s$ space, and the like, throughout this disclosure), for which the embedding can be characterized according to equation two (2), which follows:

$$p(e|v)\alpha F(\theta(e),\psi(v_c),\theta(v_O),\theta(v_a)) \quad (2)$$

In various embodiments, the stop words, such as "the", "an", "and" etc., are removed from e, $v_O$, and $v_a$ before the embedding, $\theta(\bullet)$.

Figure 2:
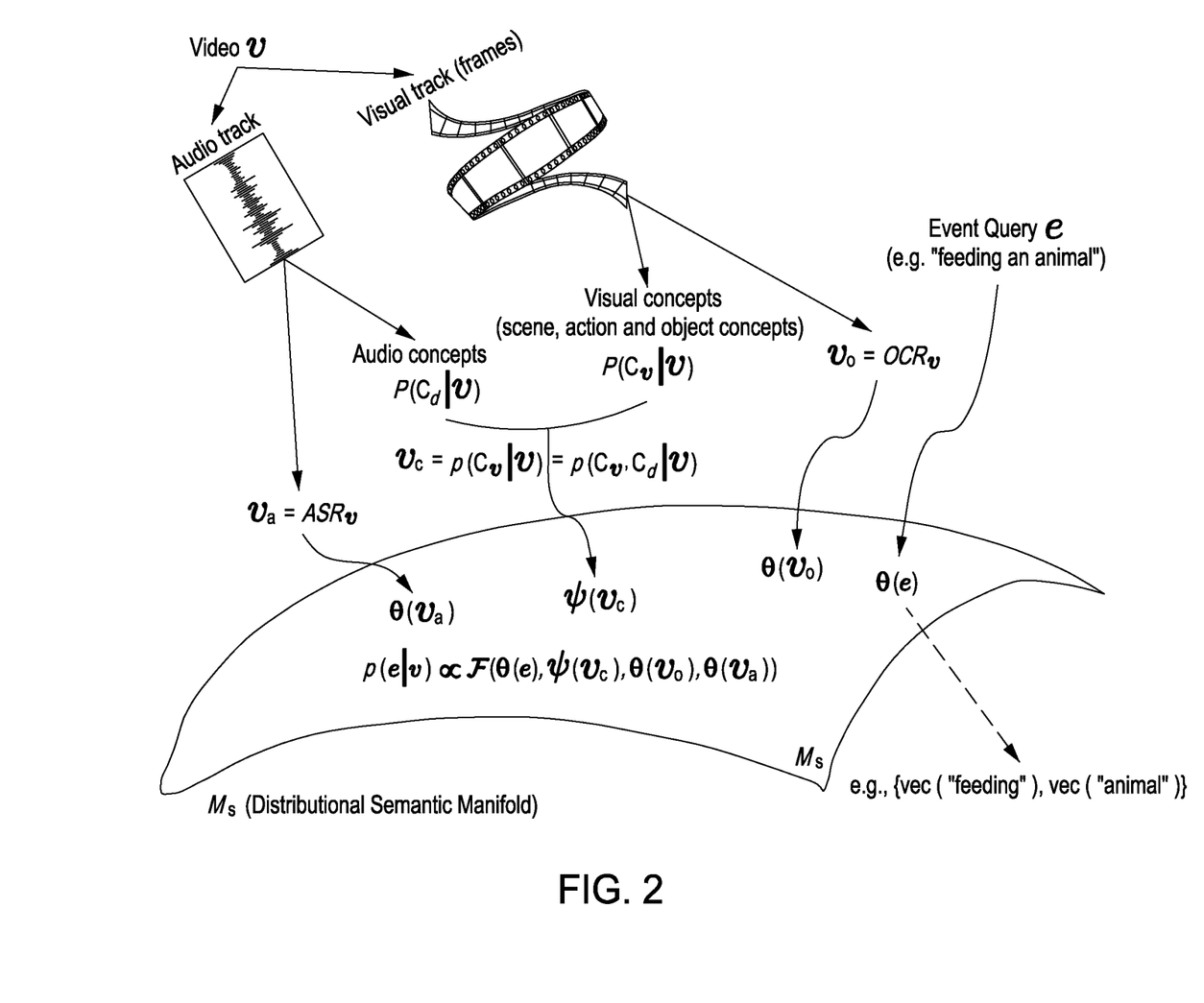
FIG. 2 depicts a graphical representation of a trained semantic space in accordance with an embodiment of the present principles.

FIG. 2 depicts a graphical representation of a semantic space, $M_s$, in accordance with an embodiment of the present principles. As depicted in FIG. 2, video components and an event query are embedded into a manifold space in accordance with a distributional semantic embedding model. In the embodiment of FIG. 2, the video components include an ASR component of the audio track of the video, an OCR component of the visual track of the video, and audio and visual concepts of the video. As depicted in FIG. 2, an exemplary event query (e.g., "feeding an animal") is also embedded into the manifold space.

To determine a relevance of concepts to an event query, a similarity function is defined between $\theta(c^*)$ and $\theta(e_c)$ as $s(\theta(e_c), \theta(c^*))$. In a first embodiment in accordance with the present principles, a version of s(X, Y) is defined where the sets X and Y are initially pooled by a sum operation. The sum pooling operation is denoted on a set by an overline. For instance, $\overline{X}=\Sigma_i x_i$ and $\overline{Y}=\Sigma_j y_j$, where $x_i$ and $y_j$ are the word vectors of the $i^{th}$ element in X and the $j^{th}$ element in Y, respectively. Then, a cosine similarity between X and Y is computed. This similarity function can be denoted by $s_p(\bullet, \bullet)$ and characterized according to Equation three (3), which follows:

$$s_p(X, Y) = \frac{\left(\sum_i x_i\right)^T \left(\sum_j y_j\right)}{\left\|\sum_i x_i\right\| \left\|\sum_j y_j\right\|} = \frac{\overline{X}^T \overline{Y}}{\|\overline{X}\| \|\overline{Y}\|} \quad (3)$$

Figure 3:
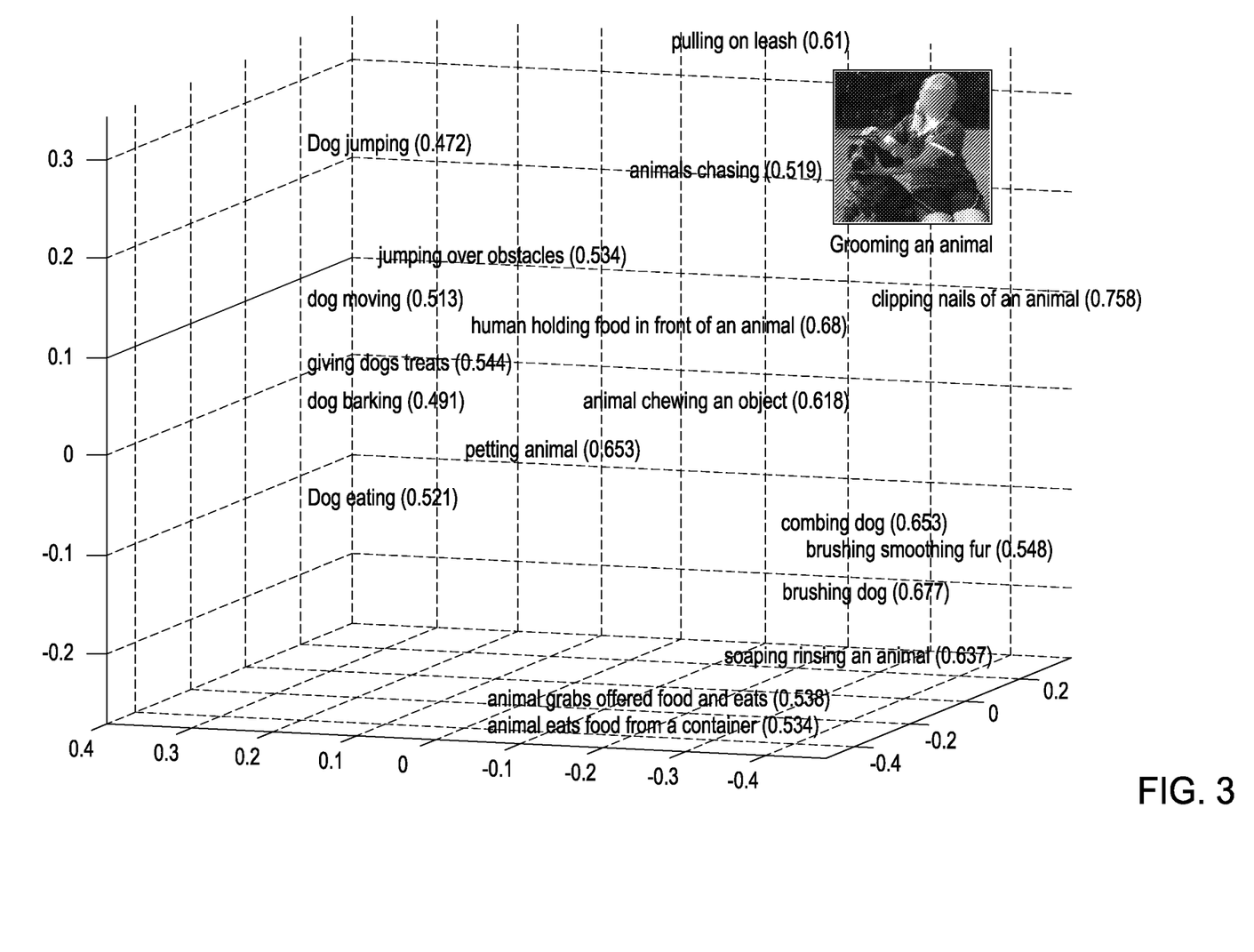
FIG. 3 depicts a 3D PCA visualization of an event query and the corresponding 20 most relevant concepts in a trained space as determined using a similarity function in accordance with an embodiment of the present principles.

FIG. 3 depicts a 3D PCA visualization of an event query for "Grooming of an Animal" and the corresponding 20 most relevant concepts in a trained $M_s$ space as determined using the similarity function, $s_p(\bullet, \bullet)$. That is, FIG. 3 depicts embedding of the event query and the relevant concept sets, $\theta(e_c=$"Grooming of an Animal") and each of $\theta(c_i)$ for the most relevant 20 concepts as represented by their corresponding pooled vectors ($\overline{\theta(e_c)}$ and $\overline{\theta(c_i)}\forall i$) normalized to unit length under L2 norm. As depicted in FIG. 3, the relevant concepts include a weighting factor (i.e., strength of association) which is representative of the relevance of the respective concept with respect to the event query. The video clips, frames, etc., representative of the concepts depicted in FIG. 3 can be returned to and displayed for an originator of the event query.

In other embodiments in accordance with the present principles, s(X, Y) is defined as a similarity function between the X and Y sets. In such embodiments, for robustness, a percentile-based Hausdorff point set metric was used, in which a similarity between each pair of points is computed by the cosine similarity. Such a similarity function can be denoted by $s_t(X, Y)$ and characterized according to equation four (4), which follows:

$$s_t(X, Y) = \min\left\{\min_i^{l\%} \max_j \frac{x_i^T y_j}{\|x_i\|\|y_i\|}, \min_i^{l\%} \max_j \frac{x_i^T y_i}{\|x_i\|\|y_i\|}\right\}. \quad (4)$$

In one embodiment, I=50% (i.e., median).

In one operational embodiment, p(e|v) is decomposed into $p(e_c|v)$, $p(e_O|v)$, and $p(e_a|v)$, which reduces a solution to deriving $p(e_c|v)$ (concept based retrieval), $p(e_O|v)$ (OCR based retrieval), and $p(e_a|v)$ (ASR based retrieval) in the $M_s$ space. With regards to deriving $p(e_c|v)$ (concept based retrieval), concepts, as used herein, are represented in the $M_s$ space by linguistic meanings that have corresponding detection functions given the video, v. In accordance with embodiments of the present principles, $M_s$ space can be represented as a space of meanings defined by a training text-corpus, where only sparse points in that space have corresponding visual detection functions given the video, v, which are the concepts, c, (e.g., "blowing a candle"). For zero shot event detection in accordance with embodiments of the present principles, these sparse points are exploited using the information captured by $s(\theta(e_c), \theta(c_i \in c)$ in $M_s$ space. As such, in some embodiments, $p(e_c|v)$ is derived from a probabilistic perspective starting from marginalizing $p(e_c|v)$ over the concept set c according to equation five (5), which follows:

$$p(e_c|v) \alpha \Sigma_{c_i} p(e_c|c_i) p(c_i|v) \alpha \Sigma_{c_i} s(\theta(e_c), \theta(c_i)) v_c^i \quad (5)$$

where $p(e|c_i) \forall i$ are assumed to be proportional to $s(\theta(e_c), \theta(c_i))$.

From a semantic embedding perspective, each video, v, is embedded into $M_s$ space by the set $\psi(v_c) = \{\theta_v(c_i) = v_c^i \theta(c_i), \forall c_i \in c\}$, where $v_c^i \theta(c_i)$ is a set of the same points in $\theta(c_i)$ scaled with $v_c^i$. $\psi(v_c)$ can then directly compared with $\theta(e_c)$ according to equation six (6), which follows:

$$p(e_c|v) \alpha \Sigma_{c_i} s(\theta(e_c), \theta(c_i)) v_c^i \alpha s'(\theta(e_c), \psi(v_c) = \{\theta_v(c_i), \forall c_i \in c\}) \quad (6)$$

where $s'(\theta(e_c), \omega(P(c|v) = \Sigma_i s(\theta(e_c), \theta(e_c), \theta_v(c_i)$ and $s(\cdot, \cdot)$ can be replaced by $s_p(\cdot, \cdot)$, $s_t(\cdot, \cdot)$, or other similarity measures in $M_s$ space.

In one embodiment, only $\theta_v(c_i)$ are included in $\psi(v_c)$ such that $c_i$ is among the top R concepts with highest $p(e_c|c_i)$. This is assuming that the remaining concepts are assigned $p(e_c|c_i) = 0$ which makes those items vanish. In such embodiments, only a few concept detectors need to be computed for on v, which results in a computational advantage.

With respect to estimating $p(e_O|v)$ (OCR based retrieval), and $p(e_a|v)$ (ASR based retrieval) in the $M_s$ space, both $v_O$ and $v_a$ can be directly embedded into the $M_s$ space since both are sets of words. As such, in one embodiment in accordance with the present principles, $p(e_O|v)$ and $p(e_a|v)$ can be modeled according to equation seven (7), which follows:

$$p(e_O|v) \alpha s_d(\theta(e_c), \theta(v_O)), p(e_a|v) \alpha s_d(\theta(e_a), \theta(v_a)) \quad (7)$$

where $s_d(X, Y) = \Sigma_{ij} x_i^T y_j$.

The similarity function described directly above can be more appropriate for ASR/OCR text since the applications normally contain more text compared with a concept definition. In one embodiment in accordance with the present principles, results of $e_a$ and $e_O$ are automatically augmented with the nearest words to an event query/title in the $M_s$ space using cosine similarity before retrieval. As such, relevant words that might appear in $v_O$ and/or $v_a$ are automatically retrieved.

Figure 4A:
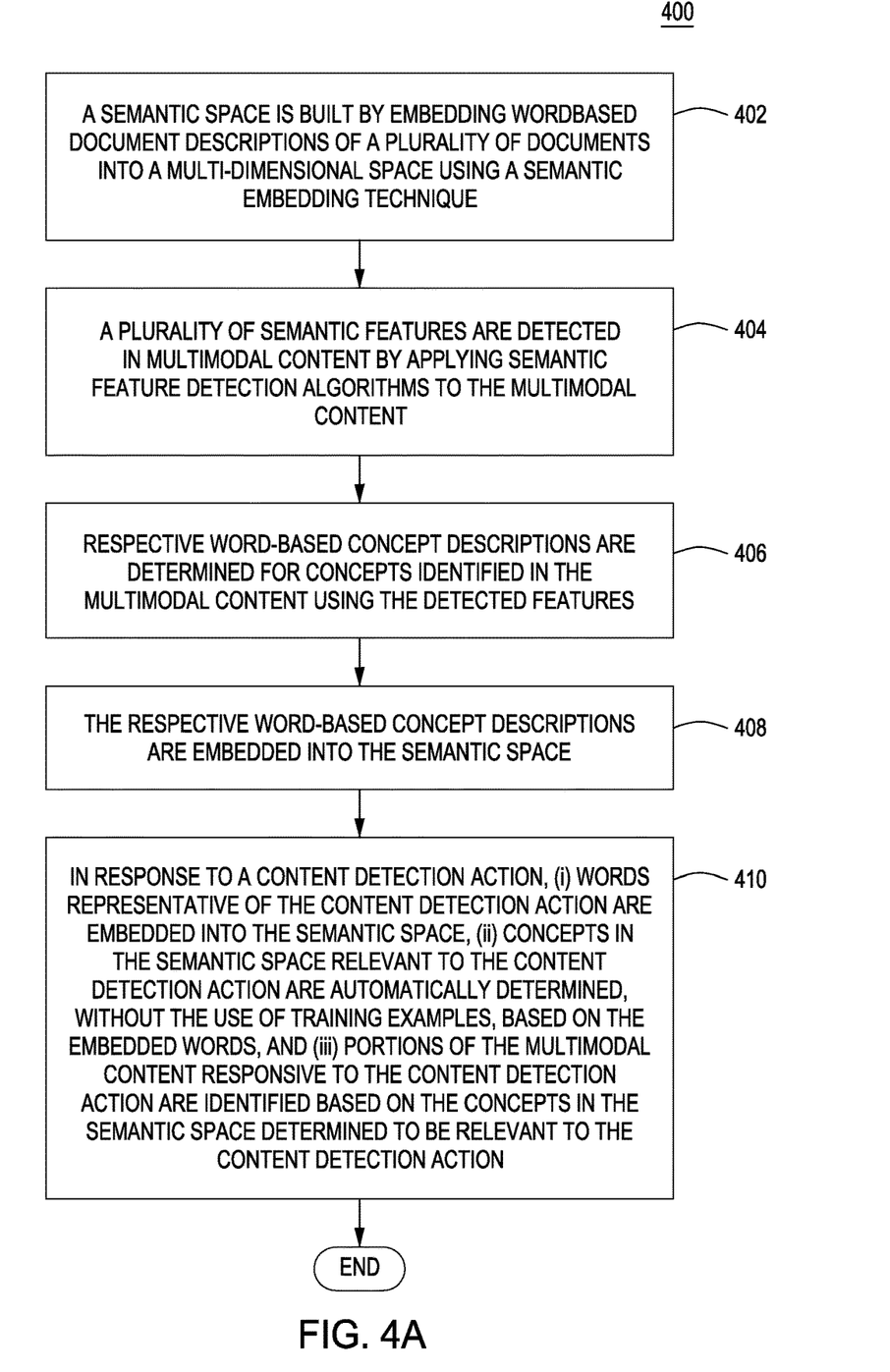
FIG. 4A depicts a flow diagram of a method for zero-shot content detection in accordance with a general embodiment of the present principles.

FIG. 4A depicts a flow diagram of a method for zero-shot content detection in accordance with a general embodiment of the present principles. The method 400 begins at step 402 during which a semantic space is built by embedding word-based document descriptions of a plurality of documents into a multi-dimensional space using a semantic embedding technique. The method 400 can proceed to 404.

At 404, a plurality of semantic features are detected in multimodal content by applying semantic feature detection algorithms to the multimodal content. As described above, in various embodiments, one or more static and dynamic feature detectors and semantic feature detection algorithms can be applied to the multimedia content to determine content features in the multimedia content. The method 400 can proceed to 406.

At 406, respective word-based concept descriptions are determined for concepts identified in the multimodal content using the detected features. The method 400 can proceed to 408.

At 408, the respective word-based concept descriptions are embedded into the semantic space. The method 400 can proceed to 410.

At 410, in response to a content detection action, (i) words representative of the content detection action are embedded into the semantic space, (ii) concepts in the semantic space relevant to the content detection action are automatically determined, without the use of training examples, based on the embedded words, and (iii) portions of the multimodal content responsive to the content detection action are identified based on the concepts in the semantic space determined to be relevant to the content detection action. The method 400 can be exited.

Figure 4B:
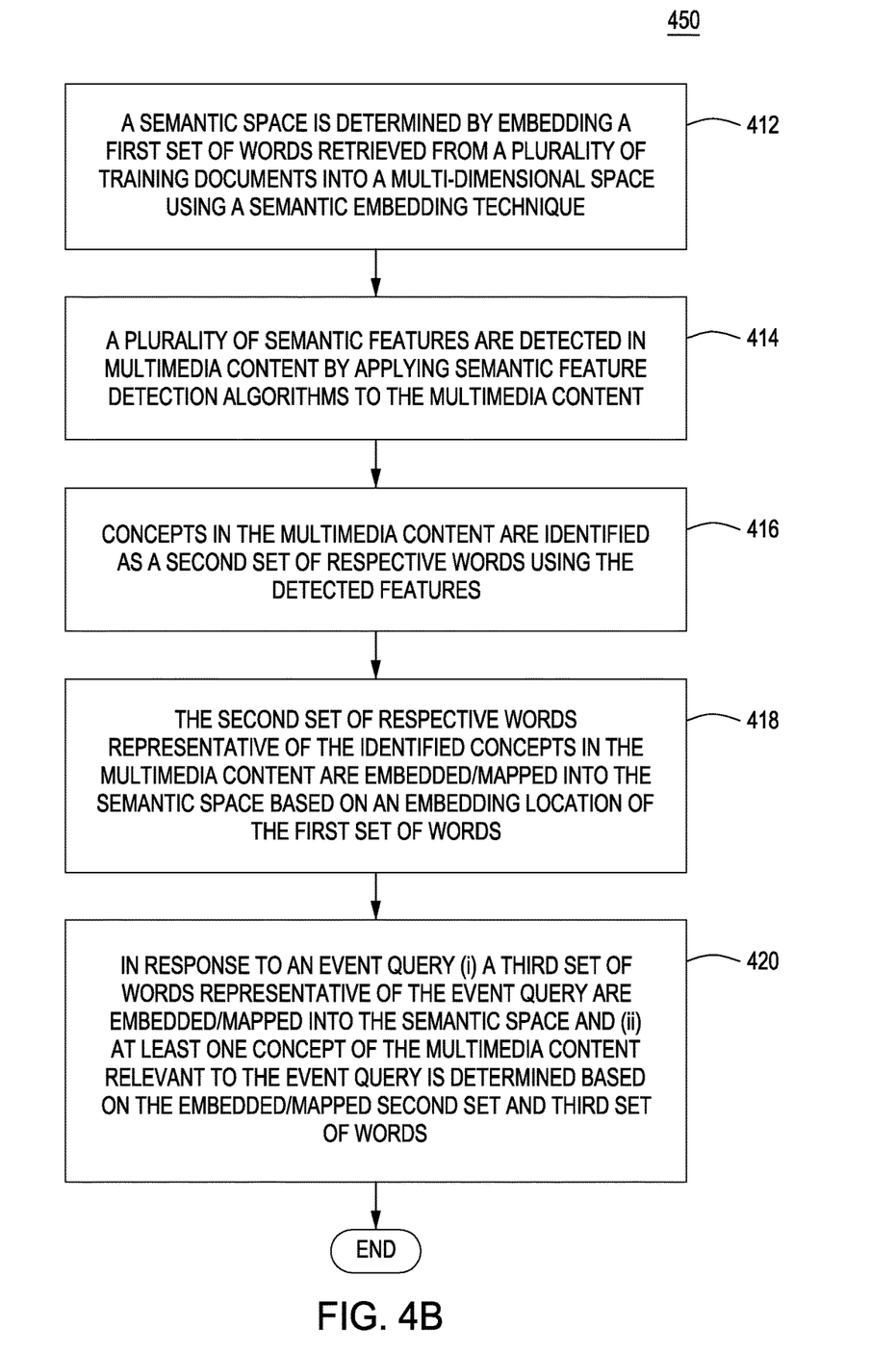
FIG. 4B depicts a flow diagram of a method for zero-shot event query in accordance with a more specific embodiment of the present principles.

FIG. 4B depicts a flow diagram of a method for zero-shot event query in accordance with a more specific embodiment of the present principles. The method 450 begins at step 412 during which a semantic space is determined by embedding a first set of words retrieved from a plurality of training documents into a multi-dimensional space using a semantic embedding technique. The method 450 can proceed to 414.

At 414, a plurality of semantic features are detected in multimedia content by applying semantic feature detection algorithms to the multimedia content. The method 450 can proceed to 416.

At 416, concepts in the multimedia content are identified as a second set of respective words using the detected features. The method 450 can proceed to 418.

At 418, the second set of respective words representative of the identified concepts in the multimedia content are embedded/mapped into the semantic space based on an embedding location of the first set of words. The method 450 can proceed to 420.

At 420, in response to an event query (i) a third set of words representative of the event query are embedded/mapped into the semantic space and (ii) at least one concept of the multimedia content relevant to the event query is determined based on the embedded/mapped second set and third set of words. The method 450 can be exited.

Referring now to FIG. 5, a simplified high level block diagram of an embodiment of the computing device 100 in which the content detection system 110 can be implemented is shown. While the computing device 100 is shown as involving multiple components and devices, it should be understood that in some embodiments, the computing device 100 can constitute a single computing device (e.g., a mobile electronic device, laptop or desktop computer) alone or in combination with other devices.

The illustrative computing device 100 can be in communication with one or more other computing systems or devices 542 via one or more networks 540. In the embodiment of FIG. 5, illustratively, a portion 110A of the content detection system 110 can be local to the computing device 510, while another portion 110B can be distributed across one or more other computing systems or devices 542 that are connected to the network(s) 540. Similarly, a portion 150A of the illustrative video collection 150 can be local to the computing device 100 while another portion 150B can distributed across one or more of the other computing systems or devices 542. In other embodiments, however, the content detection system 110 and/or the video collection 150 can be located entirely on a single computing device. In some embodiments, portions of the content detection system 110 can be incorporated into other systems or interactive software applications. Such applications or systems can include, for example, operating systems, middleware or framework software, and/or applications software. For example, portions of the content detection system 110 can be incorporated into or accessed by other, more generalized search engine(s) or intelligent assistance applications.

The illustrative computing device 100 of FIG. 5 includes at least one processor 512 (e.g. a microprocessor, microcontroller, digital signal processor, etc.), memory 514, and an input/output (I/O) subsystem 516. The computing device 100 can be embodied as any type of computing device such as a personal computer (e.g., desktop, laptop, tablet, smart phone, body-mounted device, etc.), a server, an enterprise computer system, a network of computers, a combination of computers and other electronic devices, or other electronic devices.

Although not specifically shown, it should be understood that the I/O subsystem 516 typically includes, among other things, an I/O controller, a memory controller, and one or more I/O ports. The processor 512 and the I/O subsystem 516 are communicatively coupled to the memory 514. The memory 514 can be embodied as any type of suitable computer memory device (e.g., volatile memory such as various forms of random access memory). In the embodiment of FIG. 5, the I/O subsystem 516 is communicatively coupled to a number of hardware components and/or other computing systems including one or more user input devices 518 (e.g., a touchscreen, keyboard, virtual keypad, microphone, etc.), and one or more storage media 520.

The storage media 520 may include one or more hard drives or other suitable data storage devices (e.g., flash memory, memory cards, memory sticks, and/or others). In some embodiments, portions of systems software (e.g., an operating system, etc.), framework/middleware (e.g., application-programming interfaces, object libraries, etc.), the content detection system 110A, and/or the video collection 150A reside at least temporarily in the storage media 520. Portions of systems software, framework/middleware, the content detection system 110A and/or the video collection 150 can also exist in the memory 514 during operation of the computing device 100, for faster processing or other reasons.

The one or more network interfaces 532 can communicatively couple the computing device 100 to a local area network, wide area network, a personal cloud, enterprise cloud, public cloud, and/or the Internet, for example. Accordingly, the network interfaces 532 can include one or more wired or wireless network interface cards or adapters, for example, as may be needed pursuant to the specifications and/or design of the particular computing device 100.

The other computing device(s) 542 can be embodied as any suitable type of computing device such as any of the aforementioned types of devices or other electronic devices. For example, in some embodiments, the other computing devices 542 can include one or more server computers used to store portions 150B of the video collection 150.

The computing device 100 can further optionally include an optical character recognition (OCR) system 528 and an automated speech recognition (ASR) system 530. It should be understood that each of the foregoing components and/or systems can be integrated with the computing device 100 or can be a separate component or system that is in communication with the I/O subsystem 516 (e.g., over a network). FIG. 5 further depicts a search request module 118, which although illustratively depicted as a component of the computing device 100, in other embodiments in accordance with the present principles can be a component not part of the computing device 100.

The computing device 100 can include other components, subcomponents, and devices not illustrated in FIG. 5 for clarity of the description. In general, the components of the computing device 100 are communicatively coupled as shown in FIG. 5 by signal paths, which may be embodied as any type of wired or wireless signal paths capable of facilitating communication between the respective devices and components.

In the foregoing description, numerous specific details, examples, and scenarios are set forth in order to provide a more thorough understanding of the present principles. It will be appreciated, however, that embodiments of the principles can be practiced without such specific details. Further, such examples and scenarios are provided for illustration, and are not intended to limit the teachings in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to effect such feature, structure, or characteristic in connection with other embodiments whether or not explicitly indicated.

Embodiments in accordance with the teachings can be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "'virtual machine" running on one or more computing devices). For example, a machine-readable medium may include any suitable form of volatile or non-volatile memory.

Modules, data structures, blocks, and the like are referred to as such for case of discussion, and are not intended to imply that any specific implementation details are required. For example, any of the described modules and/or data structures may be combined or divided into sub-modules, sub-processes or other units of computer code or data as may be required by a particular design or implementation of the content detection system 110. Further, references herein to rules or templates are not meant to imply any specific implementation details. That is, the content detection system 110 can store rules, templates, etc. in any suitable machine-readable format.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the teachings herein.

While the foregoing is directed to embodiments in accordance with the present principles, other and further embodiments in accordance with the principles described herein may be devised without departing from the basic scope thereof, and the scope thereof is determined by the claims that follow.

The invention claimed is:

1. An automated content detection system for semantic retrieval of multimodal content, the content detection system comprising one or more non-transitory machine accessible storage media and comprising instructions executable by one or more processors to cause a computing system to:
build a semantic space by embedding word-based document descriptions of a plurality of documents into a multi-dimensional space using a semantic embedding technique;
detect a plurality of features in the multimodal content by applying feature detection algorithms to the multimodal content;
determine respective word-based concept descriptions for concepts identified in the multimodal content using the detected features;
embed the respective word-based concept descriptions into the semantic space; and
in response to a content detection action, (i) embed words representative of the content detection action into the semantic space, (ii) automatically determine, without the use of training examples, concepts in the semantic space relevant to the content detection action based on the embedded words, and (iii) identify portions of the multimodal content responsive to the content detection action based on the concepts in the semantic space determined to be relevant to the content detection action.

2. The automated content detection system of claim 1, wherein the semantic embedding technique comprises distributional semantic embedding and the content detection action comprises at least one of a concept query or an event query.

3. The automated content detection system of claim 1, wherein the plurality of documents comprise a plurality of text-based documents comprising at least one of online news sources, online dictionaries or online encyclopedic material.

4. The automated content detection system of claim 1, wherein the word-based document descriptions of the plurality of documents describe concepts in the plurality of documents.

5. The automated content detection system of claim 1, wherein the respective word-based concept descriptions are embedded into the semantic space based on a location of the word-based document descriptions of the plurality of documents in the semantic space.

6. The automated content detection system of claim 1, wherein the words representative of the content detection action are embedded into the semantic space based on a location of the word-based document descriptions of the plurality of documents in the semantic space and corresponding word vectors for the words representative of the content detection action.

7. The automated content detection system of claim 1, wherein concepts in the semantic space relevant to the content detection action are determined using a relative location of the word-based concept descriptions and the words representative of the content detection action in the semantic space and a similarity function.

8. The automated content detection system of claim 1 wherein the computing system is further configured to: automatically deliver the identified portions of the multimodal content to a user for display.

9. A computing device for zero-shot content detection of multimodal content, comprising:
a processor; and
a memory coupled to the processor, the memory having stored therein a multimedia content understanding module, a natural language generator module and a semantic space generator module comprising instructions executable by the processor to configure the computing device to:
build a semantic space by embedding word-based document descriptions of a plurality of documents into a multi-dimensional space using a semantic embedding technique;
detect a plurality of features in the multimodal content by applying feature detection algorithms to the multimodal content;
determine respective word-based concept descriptions for concepts identified in the multimodal content using the detected features;
embed the respective word-based concept descriptions into the semantic space; and
in response to a content detection action, (i) embed words representative of the content detection action into the semantic space, (ii) automatically determine concepts in the semantic space relevant to the content detection action based on the embedded words, and (iii) identify portions of the multimodal content responsive to the content detection action based on the concepts in the semantic space determined to be relevant to the content detection action, without the use of training examples.

10. The computing device of claim 9, further comprising a user interface device to enter a content detection action and a search request module to enable the content detection action.

11. The computing device of claim 9, further comprising at least one of an optical character recognition system to generate text transcripts of text in the multimodal content and an automatic speech recognition system to generate text transcripts of speech in the multimodal content.

12. The computing device of claim 9, wherein the computing device is configured to:
deliver the identified portions of the multimodal content to a user for display.

13. A method for zero-shot content detection, comprising:
building a semantic space by embedding word-based document descriptions of a plurality of documents into a multi-dimensional space using a semantic embedding technique;
detecting a plurality of features in the multimodal content by applying feature detection algorithms to the multimodal content;
determining respective word-based concept descriptions for concepts identified in the multimodal content using the detected features;
embedding the respective word-based concept descriptions into the semantic space; and
in response to a content detection action, (i) embedding words representative of the content detection action into the semantic space, (ii) automatically determining concepts in the semantic space relevant to the content detection action based on the embedded words, and (iii) identifying portions of the multimodal content responsive to the content detection action based on the concepts in the semantic space determined to be relevant to the content detection action, without the use of training examples.

14. The method of claim 13, wherein the concepts identified in the multimodal content include at least one of audio, video and text.

15. The method of claim 13, further comprising:
delivering the identified portions of the multimedia content to a user for display.

\* \* \* \* \*